United States Patent
Sychaleun et al.

(10) Patent No.: US 8,135,086 B1
(45) Date of Patent: Mar. 13, 2012

(54) CABLE REDUCTION

(75) Inventors: Somsack Sychaleun, Kanata (CA); Steve Beaudin, Nepean (CA); Chun-Yun Jian, Ottawa (CA)

(73) Assignee: Rockstar Bidco, LP, New York, NY (US)

( * ) Notice: Subject to any disclaimer, the term of this patent is extended or adjusted under 35 U.S.C. 154(b) by 2131 days.

(21) Appl. No.: 10/914,589

(22) Filed: Aug. 9, 2004

(51) Int. Cl.
*H04L 27/10* (2006.01)

(52) U.S. Cl. ........ 375/275; 375/267; 375/260; 375/299; 375/348; 375/349

(58) Field of Classification Search ................. 370/339; 455/561, 422, 523; 375/257, 267, 275, 260, 375/299, 348, 349
See application file for complete search history.

(56) References Cited

U.S. PATENT DOCUMENTS

| | | | |
|---|---|---|---|
| 4,768,187 A | 8/1988 | Marshall | |
| 4,839,894 A | 6/1989 | Rudish et al. | |
| 5,216,434 A * | 6/1993 | Fukumura | 343/876 |
| 5,289,505 A | 2/1994 | LaRosa et al. | |
| 5,748,669 A | 5/1998 | Yada | |
| 5,774,193 A | 6/1998 | Vaughan | |
| 5,784,683 A | 7/1998 | Sistanizadeh et al. | |
| 5,818,875 A | 10/1998 | Suzuki et al. | |
| 5,832,389 A | 11/1998 | Dent | |
| 5,883,901 A * | 3/1999 | Chiu et al. | 370/508 |
| 6,011,513 A | 1/2000 | Wilson et al. | |
| 6,088,381 A | 7/2000 | Myers, Jr. | |
| 6,125,109 A | 9/2000 | Fuerter | |
| 6,148,219 A | 11/2000 | Engelbrecht et al. | |
| 6,178,158 B1 | 1/2001 | Suzuki et al. | |
| 6,192,070 B1 | 2/2001 | Poon et al. | |
| 6,252,548 B1 * | 6/2001 | Jeon | 342/383 |
| 6,266,545 B1 | 7/2001 | Backman et al. | |
| 6,366,789 B1 * | 4/2002 | Hildebrand | 455/561 |
| 6,462,704 B2 | 10/2002 | Rexberg et al. | |
| 6,522,642 B1 | 2/2003 | Scott | |
| 6,535,732 B1 | 3/2003 | McIntosh et al. | |

(Continued)

FOREIGN PATENT DOCUMENTS

EP  1443594 A2  1/2004

(Continued)

OTHER PUBLICATIONS

No Author, "Applications of PIN Diodes," Internet article, pp. 12-14, Application Note 922, Agilent Technologies, http://www.qsl.net/n9zia/wireless/pdf/an922.pdf, City/Country Unknown.

(Continued)

*Primary Examiner* — Kabir A Timory
(74) *Attorney, Agent, or Firm* — Withrow & Terranova, PLLC

(57) ABSTRACT

The present invention provides combining and separation circuitry, which allows multiple signals in different frequency bands to travel in either direction over a single cable and be combined and separated as desired. In one embodiment, the combining and separation circuitry includes first, second, third, and fourth ports. The first port is configured to send or receive signals in a first frequency band, the second port is configured to send or receive signals in a second frequency band, and the third port is configured to send or receive DC signals, baseband signals, or a combination thereof. The fourth port is configured to be coupled to a cable in which the signals in the first and second frequency bands, as well as the DC and/or baseband signals, can be sent in either direction.

34 Claims, 7 Drawing Sheets

U.S. PATENT DOCUMENTS

| | | | |
|---|---|---|---|
| 6,594,508 B1 * | 7/2003 | Ketonen | 455/561 |
| 6,640,111 B1 * | 10/2003 | Shapira | 455/562.1 |
| 6,657,978 B1 | 12/2003 | Millman | |
| 6,760,342 B1 | 7/2004 | Skones et al. | |
| 6,801,788 B1 | 10/2004 | Csapo et al. | |
| 6,826,163 B2 | 11/2004 | Mani et al. | |
| 6,831,901 B2 | 12/2004 | Millar | |
| 6,963,305 B2 * | 11/2005 | Knapp | 342/367 |
| 6,983,174 B2 | 1/2006 | Hoppenstein et al. | |
| 7,038,621 B2 | 5/2006 | Gabriel et al. | |
| 7,069,051 B1 | 6/2006 | Katz | |
| 7,123,939 B1 | 10/2006 | Bird et al. | |
| 7,181,243 B1 | 2/2007 | Nicholls et al. | |
| 7,424,039 B2 | 9/2008 | Deane et al. | |
| 2001/0044323 A1 | 11/2001 | Waylett | |
| 2002/0132644 A1 | 9/2002 | Mellor et al. | |
| 2002/0196497 A1 | 12/2002 | LoCascio et al. | |
| 2003/0071639 A1 * | 4/2003 | Haag et al. | 324/674 |
| 2003/0109283 A1 | 6/2003 | Shapira et al. | |
| 2003/0148747 A1 | 8/2003 | Yamamoto | |
| 2004/0190479 A1 | 9/2004 | Deane et al. | |
| 2004/0190480 A1 * | 9/2004 | Deane et al. | 370/339 |
| 2004/0266356 A1 | 12/2004 | Javor et al. | |
| 2005/0215288 A1 | 9/2005 | Beaudin et al. | |
| 2005/0250541 A1 * | 11/2005 | Bird et al. | 455/561 |
| 2006/0003808 A1 | 1/2006 | Haskell et al. | |
| 2006/0067262 A1 | 3/2006 | Troemel, Jr. | |
| 2006/0252461 A1 | 11/2006 | Grant et al. | |

FOREIGN PATENT DOCUMENTS

| | | |
|---|---|---|
| WO | 9744908 A1 | 11/1997 |
| WO | WO 99/26317 A1 | 5/1999 |
| WO | WO 00/41339 A1 | 7/2000 |
| WO | 2005088764 A1 | 9/2005 |

OTHER PUBLICATIONS

Jaffe, J. S. and Mackey, R. C., "Microwave Frequency Translator," article, May 1965, pp. 371-372, vol. 13, issue 3, IEEE Transactions on Microwave Theory and Techniques, City/Country Unknown.

No Author, "Applications of PIN Diodes," Internet Article, Application Note 922, Agilent Technologies, Nov. 1999, http://www.gsl.net/n9zia/wireless/pdf/an922.pdf, pp. 12-14.

European Search Report for European Patent Application No. 06795513.8 issued Dec. 30, 2011, 6 pages.

* cited by examiner

CABLE REDUCTION

FIELD OF THE INVENTION

The present invention relates to radio frequency communications, and in particular to transmitting and receiving signals at different frequencies over a common cable.

BACKGROUND OF THE INVENTION

In many electronics environments, numerous cables are necessary to connect various types of electronic modules. Given the expense of cabling with respect to the ever-decreasing cost of electronics, cabling is often a significant expense. In cellular communication environments, the electronics used to facilitate receiving and transmitting signals are distributed between a base housing and a masthead, which is mounted atop a building, tower, or like mast structure. The actual antennas used for transmitting and receiving signals are associated with the masthead. The masthead will generally include basic electronics to couple the antennas to corresponding antenna feeder cables, which connect to transceiver and amplifier electronics located in the base housing.

Historically, the amount of electronics placed in the masthead has been minimized, due to inhospitable environmental conditions, such as lightning, wind, precipitation, and temperature extremes, along with the difficulty in replacing the electronics when failures occur. Maintenance of the masthead is time-consuming and dangerous, given the location of the masthead. Minimizing the electronics in the masthead has resulted in essentially each antenna being associated with a separate antenna feeder cable.

As time progresses, the cost of the electronics has been greatly reduced, whereas the cost of the antenna feeder cables has held relatively constant, if not increased. Thus, a decade ago the antenna feeder cables were an insignificant cost associated with a base station environment, whereas today the cost of the antenna feeder cables is a significant portion of the cost associated with the base station environment. Accordingly, there is a need to minimize the number of antenna feeder cables associated with a base station environment, without impacting the functionality or operability of the base station environment. Further, there is a need to minimize the increase in cost associated with the masthead and base housing electronics due to minimizing the number of antenna feeder cables required to connect the masthead electronics to the base housing electronics. Furthermore, it is also desirable to minimize the number of cables connecting two RF modules which may be located in the same housing.

SUMMARY OF THE INVENTION

The present invention provides combining and separation circuitry, which allows multiple signals in different frequency bands to travel in either direction over a single cable and be combined and separated as desired. In one embodiment, the combining and separation circuitry includes first, second, third, and fourth ports. The first port is configured to send or receive signals in a first frequency band, the second port is configured to send or receive signals in a second frequency band, and the third port is configured to send or receive DC and/or baseband signals in a third frequency band. The signals in the third frequency band may be DC, baseband, or a combination of DC and baseband signals. The fourth port is configured to be coupled to a cable in which the signals in the first and second frequency bands, as well as the DC or baseband signals, can be sent in either direction. The combining and separation circuitry may be constructed using one or more LC (inductor/capacitor) networks, which support the combining and separation of signals, depending on the direction in which the signals are traveling. Similar combining and separation circuitry may be provided at the other end of the cable such that electronics systems may communicate with each other in the different frequency bands over the cable.

In one embodiment, combining and separation circuitry is provided in both the masthead and base housing electronics in a base station environment. In such an environment, radio frequency transmit and receive signals may be transmitted within the first frequency band, synchronization signals and data may be transmitted within the second frequency band, and power may be supplied to the masthead from the base station using a DC signal. Also, communications between the masthead and base station may be facilitated using a baseband signal. All of these signals may be carried simultaneously over the cable. Additionally, the combining and separation circuitry may implement surge protection circuitry to protect associated electronics from electrical surges caused by electronic malfunction or lightning.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
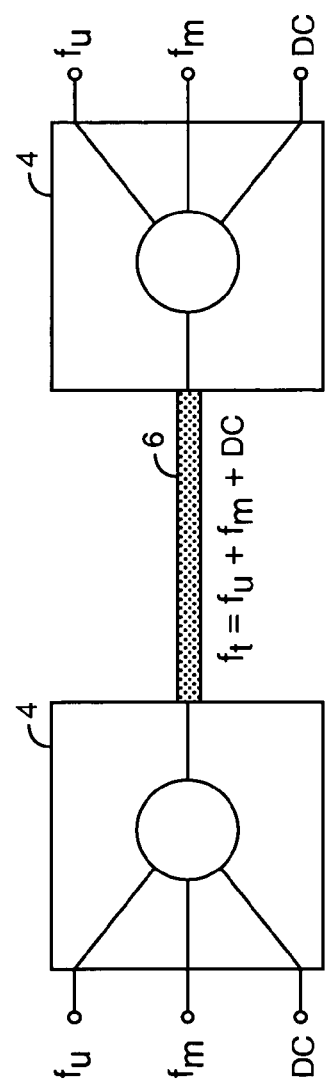
FIG. 1 is a block representation of a cable reduction system according to one embodiment of the present invention.

The present invention enables various signals at different frequencies to traverse a single cable in a simple and low-cost fashion. The invention is applicable in any environment where cable reduction is beneficial, such as between modules in any form of electronic system, or in a base station and masthead in a cellular communication environment. A block representation of the basic functionality of the present invention is illustrated in FIG. 1. As illustrated, a cable reduction system 2 will include combining and separation circuitry 4 coupled together by a cable 6. In one embodiment, the combining and separation circuitry 4 is configured to allow signals to traverse the cable 6 in both directions in various frequency bands. As illustrated, there are essentially three frequency bands making up the total frequency band $f_t$. The first frequency band is an upper frequency band $f_u$, which is configured to contain higher frequencies, such as radio frequencies. A second frequency band is the middle frequency band $f_m$, which includes frequencies in a band less than that defined by the upper frequency band L. The third frequency band may be reserved for DC, baseband, or a combination of DC and baseband signals. Notably, signals at frequencies in any of the bands ($f_u$, $f_m$, DC, or baseband) may traverse the cable 6 in either direction. Preferably, signals traversing the cable in either direction will operate at different frequencies so as to minimize interference with one another. Accordingly, the cable 6 will include signals at a variety of frequencies within the various frequency bands, such that the frequencies represented at any given time in the signals carried by the cable 6 will be $f_u+f_m+DC$ (and/or baseband). Detailed examples are provided further below.

Figure 2:
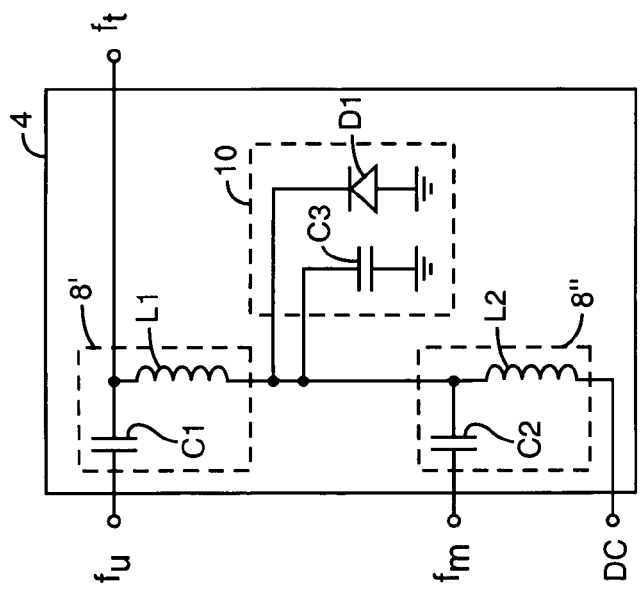
FIG. 2 is a block representation of combining and separation circuitry according to one embodiment of the present invention.

Turning now to FIG. 2, exemplary separation and combining circuitry 4 is illustrated according to one embodiment of the present invention. As illustrated, the separation and combining circuitry 4 will include four ports for receiving or providing signals at the respective frequencies. The separation and combining circuitry 4 of FIG. 2 is a dual bias tee configuration, wherein a first bias tee circuit 8' is configured to pass frequencies from the port for the upper frequency band $f_u$ to the port for the total frequency band $f_t$, and vice versa, such that signals coming in to the total frequency port are filtered so that only the signals in the upper frequency band are provided out of the combining and separation circuitry 4 at the port for the upper frequency band $f_u$. The bias tee circuitry 8' provides the necessary filtering for such operation. Thus, the representative LC circuit includes a capacitor C1 configured for passing frequencies in the upper frequency band in either direction as well as inductor L1 which acts as a high impedance choke for signals in the upper frequency band.

The combining and separation circuitry 4 also includes a second bias tee circuit 8", which is coupled to the first bias tee circuit 8'. The second bias tee circuit 8" includes a port for receiving or providing signals in the middle frequency band $f_m$. In operation, signals provided to the port for the middle frequency band $f_m$ are passed through the capacitor C2, through the inductor L1 of the first bias tee circuit 8', and out through the port for the total frequency band $f_t$. The capacitor C2 and inductor L1 are configured to pass signals in the middle frequency band $f_m$. Further, signals within the middle frequency band that arrive at the combining and separation circuitry 4 at the port for the total frequency band $f_t$ are passed through inductor L1 and capacitor C2 and are output through the port for the middle frequency band $f_m$. Given the interplay between the filtering circuitry of the bias tee circuits 8' and 8", signals most sensitive to attenuation are provided a path with the least impedance for the given operating frequency. In the illustrated embodiment, the signals in the upper frequency band $f_u$ are deemed most sensitive to attenuation and most important, and are thus provided a path through capacitor C1, wherein the signals in the upper frequency band $f_u$ are passed with relatively minimal attenuation. In contrast, the capacitor C1 may filter frequencies outside of the upper frequency band $f_u$. The values for capacitor C2 and inductor L1 are chosen to minimize the impact on the upper frequency band $f_u$ while providing the least impedance possible in light of these design limitations for signals in the middle frequency band $f_m$ that are passing in either direction between the ports for the middle frequency band $f_m$ and the total frequency band $f_t$.

The second bias tee circuit 8" also includes a third port for providing or receiving a DC (and/or baseband) signal. The DC (and/or baseband) signal path between the port for the DC signal and the port for the total frequency band $f_t$ will be through the inductors L1 and L2. The effect of the dual bias tee configuration of the combining and separation circuitry 4 is such that the signals in the upper frequency band $f_u$, middle frequency band $f_m$, or at DC (and/or baseband) are able to pass in either direction through the combining and separation circuitry 4 in a simultaneous fashion without causing significant interference with other signals. Further, signals at different frequencies may be provided in the same direction traveling in either direction through the combining and separation circuitry 4, regardless of in which direction they are traveling. Thus, the combining and separation circuitry 4 provides for simple and effective multiplexing and de-multiplexing functions in both directions in a simultaneous fashion.

The combining and separation circuitry 4 may also include protection circuitry 10, such as that for providing lightning protection. The lightning protection circuitry 10 may include various components for handling an electrical surge and directing that energy to ground. As illustrated, the lightning protection circuitry 10 includes a capacitor C3 and a diode D1 in parallel to ground from a node interconnecting the bias tee circuitries 8' and 8". The diode D1 may be a high voltage diode or gas discharge tube commonly used in lightning protection applications. Those skilled in the art will recognize that the components illustrated in the combining and separation circuitry 4 are for illustrative purposes only, and the actual circuit implementations may include more complex filtering networks having multiple components, which may be active or passive.

In a more general sense capacitor C1 may represent any high pass filter with a cut off frequency which falls between frequency bands $f_u$ and $f_m$, such that $f_u$ falls within the passband of the high pass filter and passes with relatively little loss, while signals within band $f_m$ fall outside of the passband and are presented with a high impedance. Similarly, inductor L1 may represent a low pass filter whose cut off frequency is below frequency band $f_u$ but above frequency band $f_m$ such as to provide a high impedance at $f_u$ while allowing signals within band $f_m$ to pass. Capacitor C2 may also represent a high pass filter, which will allow signals within frequency band $f_m$ to pass while providing a high impedance to signals at DC or baseband. Finally, Inductor L2 may represent a low pass filter whose cutoff frequency is below frequency band $f_m$, thereby providing a high impedance to signals within frequency band $f_m$, yet of sufficient bandwidth to allow the required DC or baseband signals to pass.

Figure 3:
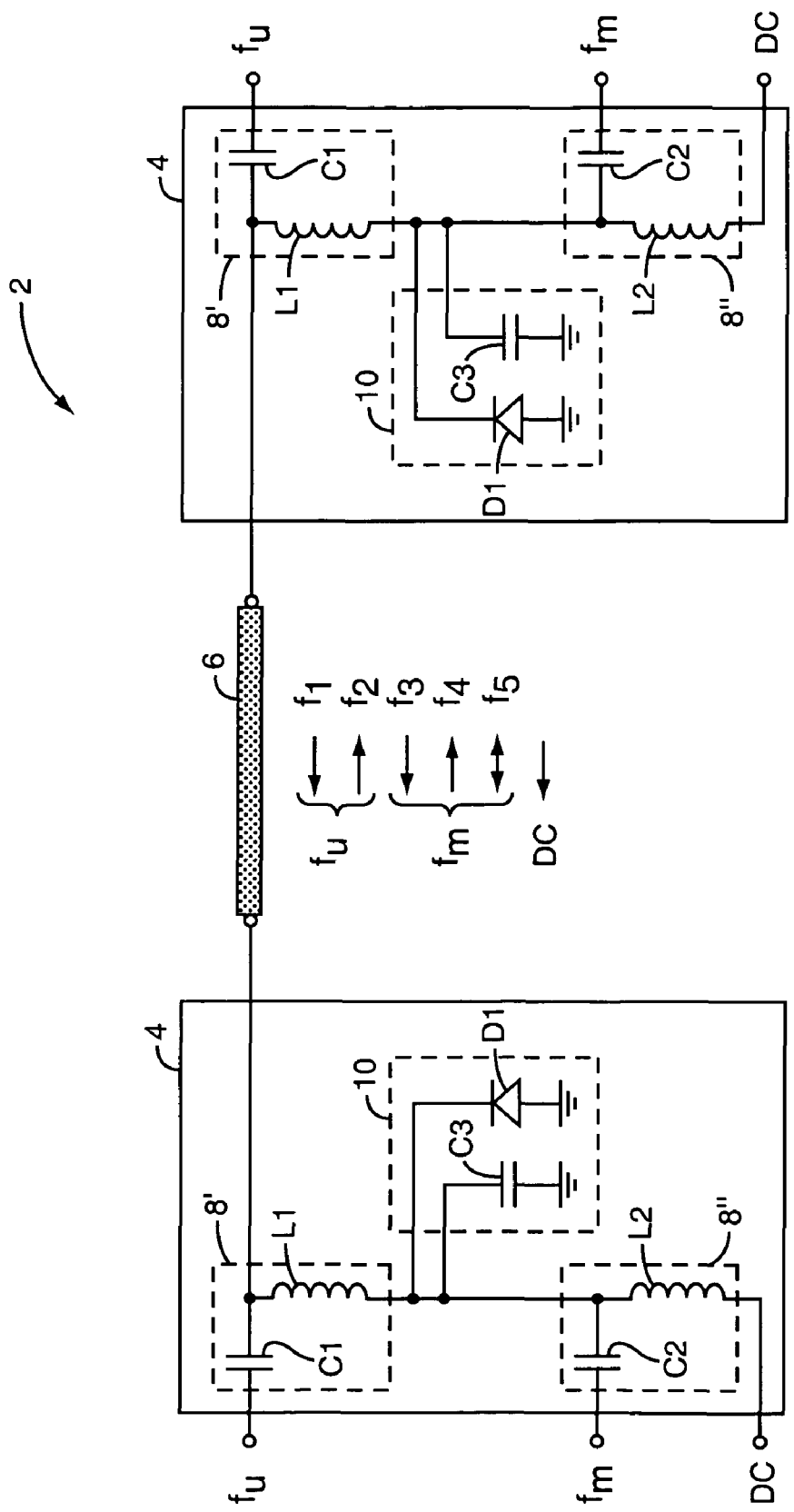
FIG. 3 is an exemplary embodiment of a cable reduction system according to one embodiment of the present invention.

Turning now to FIG. 3, an exemplary cable reduction system 2 is illustrated to incorporate the combining and separation circuitry 4 illustrated in FIG. 2. Notably, the same or substantially similar configuration for the combining and separation circuitries 4 on either end of the cable 6 is employed. In this example, two signals operating at first and second frequencies $f_1$ and $f_2$ are within the upper frequency band $f_u$. These signals flow in opposite directions between the combining and separation circuitries 4. As such, the first signal operating at the first frequency is traveling from right to left, wherein the second signal operating at the second frequency is traveling from left to right across the cable 6. Within the middle frequency band, there are three signals operating at frequencies $f_3$, $f_4$, and $f_5$. The first signal operating at frequency $f_3$ is traveling right to left, the second signal operating at frequency $f_4$ is traveling left to right, and the third signal operating at frequency $f_5$ may travel in either direction. The third signal may represent bidirectional data communications that occur at a given baseband frequency. A DC signal, such as that for providing power, is provided from right to left. A baseband signal could either travel from left to right, right to left, or may be bi-directional, depending on the application. At any given time, the cable 6 may include signals at each of the five frequencies ($f_1$ through $f_5$), as well as the DC or baseband signal. When the combining and separation circuitry 4 is separating signals, only signals within the given frequency band are output at the corresponding port, and all signals outside of the frequency band are sufficiently suppressed through filtering.

The present invention is particularly beneficial in the reduction of cabling required in a base station environment. In general, signals that were normally transmitted over separate cables are frequency shifted about different center frequencies, combined, and sent over a single cable. At a receiving end of the cable 6, the combined signals are recovered and processed in traditional fashion. The invention is particularly useful in a diversity environment, wherein multiple antennas are used to receive a common signal. In such an environment, certain of the signals received from the main and diversity antennas are shifted in frequency, combined with one another, and transmitted over a common cable. Accordingly, each sector, which includes a main and one or more diversity antennas, will need only one cable for transmitting the received signals from the antennas to electronics in a base housing.

Figure 4:
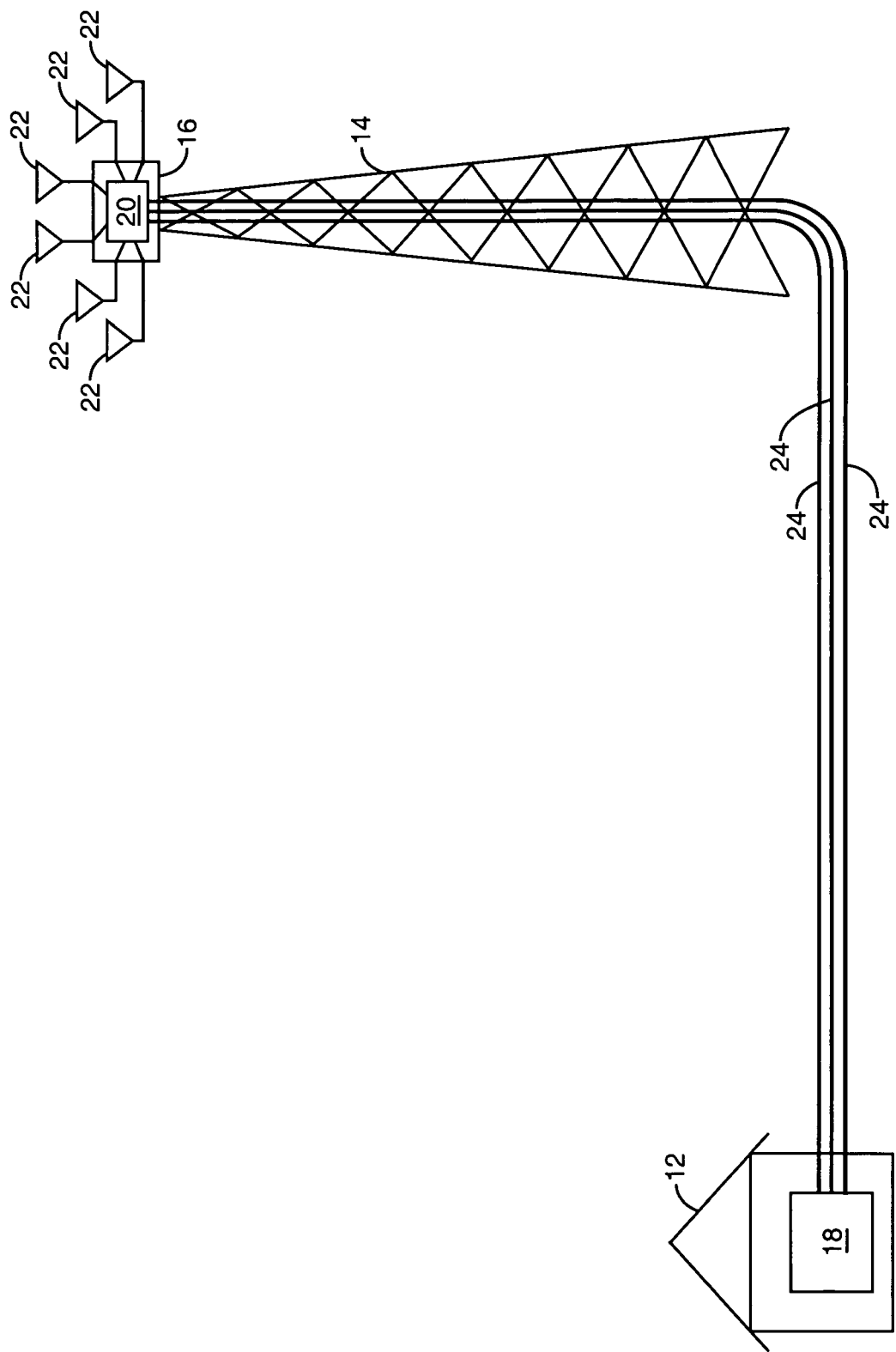
FIG. 4 is a block representation of a base station environment according to one embodiment of the present invention.

Further, the present invention allows power, data, and synchronization signals to be provided over the same cable, which is used for the radio frequency signals. An overview of a base station environment is illustrated in FIG. 4 according to one embodiment of the present invention. The illustrated base station environment is exemplary of the primary components in a cellular access network. A base housing 12 is provided in a secure location in association with a mast 14, which may be a tower or other structure near the top of which is mounted a masthead 16. Communications for the base station environment are distributed between the masthead 16 and the base housing 12. In particular, the base housing 12 will include base housing electronics 18, which include the primary transceiver and power amplification circuitry required for cellular communications. The masthead 16 will include masthead electronics 20, which generally comprise the limited amount of electronics necessary to operatively connect with multiple antennas 22, which are mounted on the masthead 16. The masthead electronics 20 and the base housing electronics 18 are coupled together with one or more feeder cables 24. For the illustrated embodiment, there are six antennas 22 divided into three sectors having two antennas 22 each. For each sector, one feeder cable 24 is provided between the masthead electronics 20 and the base housing electronics 18. Accordingly, there are three feeder cables 24 illustrated in FIG. 4. In traditional base station environments 10, each antenna would be associated with one feeder cable 24.

Figure 5:
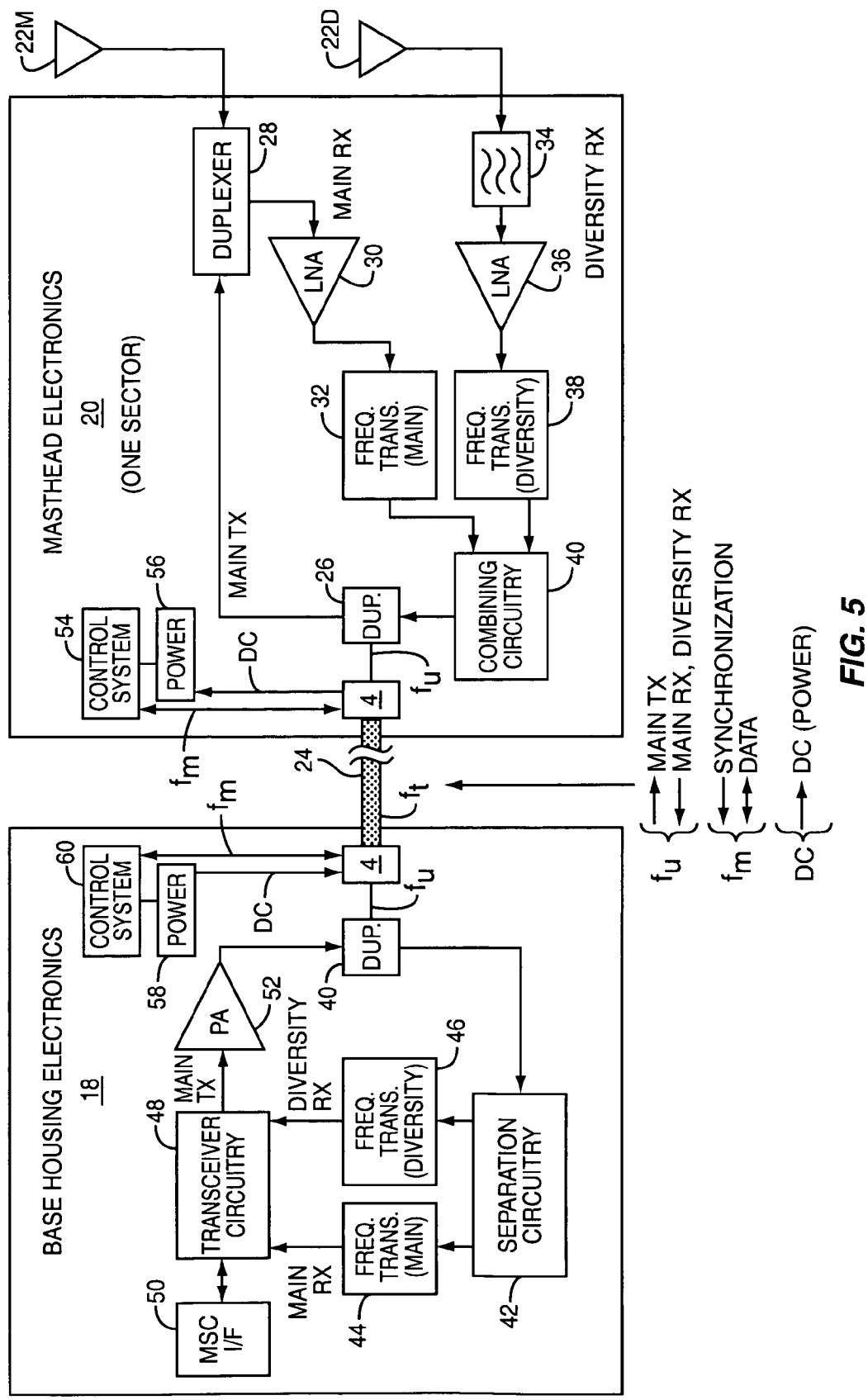
FIG. 5 is a block representation of base housing electronics and masthead electronics according to a first embodiment of the present invention.

Turning now to FIG. 5, a block representation of the base housing electronics 18 and one sector of the masthead electronics 20 is provided according to one embodiment of the present invention. Notably, there are two antennas 22 illustrated. A first antenna is referred to as a main antenna 22M, and the second antennas is referred to as a diversity antenna 22D. For signals transmitted from the main antenna 22M, a signal to be transmitted will be provided over the feeder cable 24 to a duplexer 26 in the masthead electronics 20. The signal to be transmitted (MAIN TX) is sent to another duplexer 28 and transmitted via the main antenna 22M.

For receiving, signals transmitted from remote devices will be received at both the main antenna 22M and the diversity antenna 22D. The signals received at the main antenna 22M are referred to as the main receive signals (MAIN RX), and the signals received at the diversity antenna 22D are referred to as the diversity receive signals (DIVERSITY RX). In operation, the main receive signal received at the main antenna 22M is routed by the duplexer 28 to a low noise amplifier (LNA) 30, which will amplify the main receive signal and present it to main frequency translation circuitry 32. The main frequency translation circuitry 32 will effect a frequency translation, which is essentially a shift of the main receive signal from being centered about a first center frequency to being centered around a second center frequency. The main frequency translation circuitry 32 may take the form of a mixer, serrodyne, or the like, which is capable of shifting the center frequency of the main receive signal.

Similarly, the diversity receive signal received at the diversity antenna 22D may be filtered via a filter 34 and amplified using an LNA 36 before being presented to diversity frequency translation circuitry 38. The diversity frequency translation circuitry 38 will effect a frequency translation of the diversity receive signal from being centered about the first center frequency to being centered about a third center frequency. Preferably, the first, second, and third center frequencies are sufficiently different as to allow signals being transmitted or received at those frequencies to be combined without interfering with one another.

Figure 6:
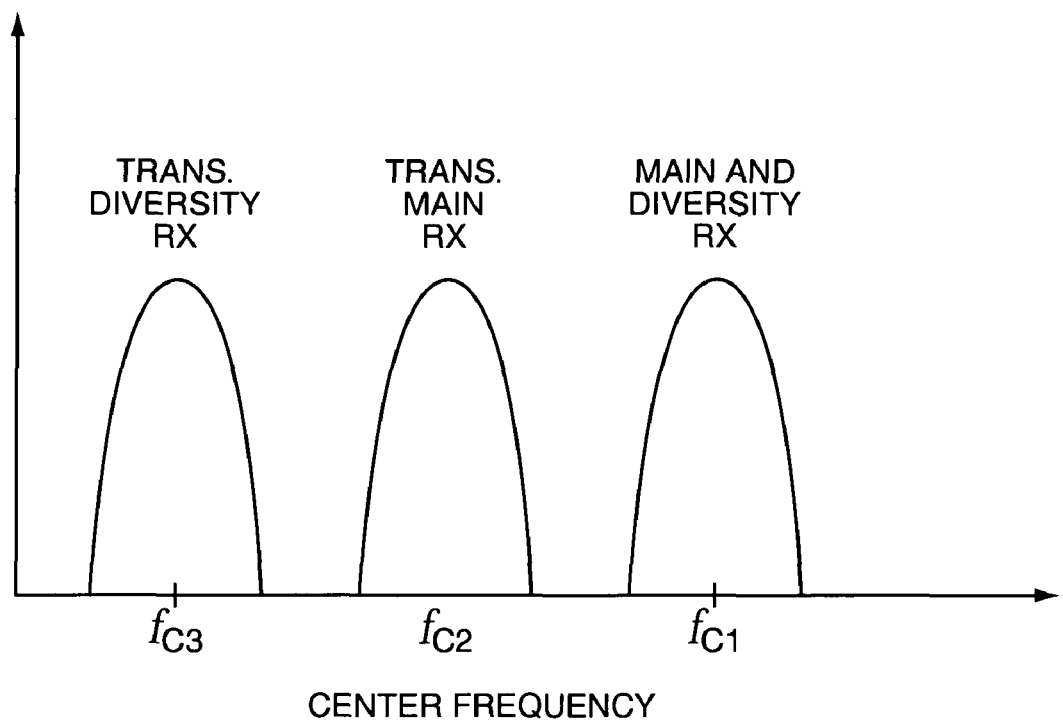
FIG. 6 is a graphical illustration of a frequency translation process according to the embodiment of FIG. 5.

With reference to FIG. 6, a graphical illustration of the frequency translation process is provided. As illustrated, the main and diversity receive signals are centered about the first center frequency $f_{C1}$, wherein the translated main receive signal is centered about center frequency $f_{C2}$ and the translated diversity receive signal is centered about center frequency $f_{C3}$. The center frequencies are sufficiently spaced along the frequency continuum to avoid any interference between the signals transmitted on those center frequencies.

Returning to FIG. 5, the translated main receive signal and the translated diversity receive signal provided by the main and diversity frequency translation circuitries 32 and 38 are then combined with combining circuitry 40 and presented to the duplexer 26. The duplexer 26 will then transmit the composite signal to the base housing electronics 18.

The composite signal will be received by a duplexer 40 and provided to separation circuitry 42, which will effectively separate the translated main receive signal and the translated diversity receive signal and provide them to main frequency translation circuitry 44 and diversity frequency translation circuitry 46, respectively. The translated main and diversity receive signals will be shifted back to being centered about the first center frequency $f_{C1}$, which was originally used for transmitting the main and diversity receive signals from the remote device. Accordingly, the main and diversity receive signals are recovered by the main and diversity frequency translation circuitries 44 and 46 and provided to transceiver circuitry 48, wherein the receive signals are processed in traditional fashion and forwarded to a mobile switching center (MSC) or other device via an MSC interface 50.

For transmitted signals, the base housing electronics 18 will generate a main transmit signal (MAIN TX) using the transceiver circuitry 48 and provide the main transmit signal to a power amplifier (PA) 52. The amplified main transmit signal will then be transmitted to the duplexer 40, which will send the amplifier main transmit signal over the feeder cable 24 toward the masthead electronics 20, which will route the main transmit signal to the main antenna 22M as described above.

The previous embodiment is configured to minimize the impact on the existing transceiver circuitry 48 in the base housing electronics 18. In an alternative embodiment, the translated main and diversity receive signals may be presented directly to the transceiver circuitry 48, which may be modified to be able to process the signals directly, instead of requiring them to be translated back to being centered about their original center frequency, $f_{C1}$. Further, the receive signals that are translated may be shifted up or down in frequency to varying degrees. For example, the receive signals may be shifted down to an intermediate frequency, to a very low intermediate frequency, or to a near DC frequency, such as that used in Zero IF architectures.

Power may be fed from the base housing electronics 18 to the masthead electronics 20 via the antenna feeder. Power would be coupled to the feeder cable 24 and off of the feeder cable 24 using the combining and separation circuitries 4. For example, the power supply 56 of the masthead electronics 20 may receive power originating from a power supply 58 of the base housing electronics 18 via the combining and separation circuitries 4 and the feeder cable 24. Generally, the power supply is DC. A bidirectional communication link between the control systems 60 and 54 of the base housing electronics 18 and masthead electronics 20, respectively, may also be desirable and implemented. The communication link could be within a middle frequency band, $f_m$, and may be facilitated over the feeder cable 24 using the combining and separation circuitry 4. Alternatively, the communication link could be implemented at baseband and superimposed over top of the DC power voltage.

Furthermore, if it is desirable to control the frequency translation to a high level of precision, a synchronization signal, such as a clock signal ($f_{CLK}$), in the form of a sine wave could be fed up the feeder cable 24 from the base housing electronics 18 and be extracted by the masthead electronics 20 using the combining and separation circuitry 4. The clock signal, $f_{CLK}$, could be a sine wave in the range of 100 to 200 MHz, which is also within the middle frequency band, $f_m$, to facilitate separation from the RX and TX signals.

Redundancy is often an issue for the masthead electronics 20. It is therefore desirable that a minimum amount of functionality be maintained in the event of a hardware failure with either the LNAs or frequency translation circuitry. It would therefore be advantageous in both the main and diversity receive paths be equipped with frequency translation circuitry. If one frequency translation circuit 32 should fail, the main signal would pass through the redundant circuitry unshifted and remain at its original frequency. In such an event the main receive signal could propagate downwards to the base housing electronics 18 at its original RF frequency and the diversity receive signal would continue to be propagated as described.

Figure 7:
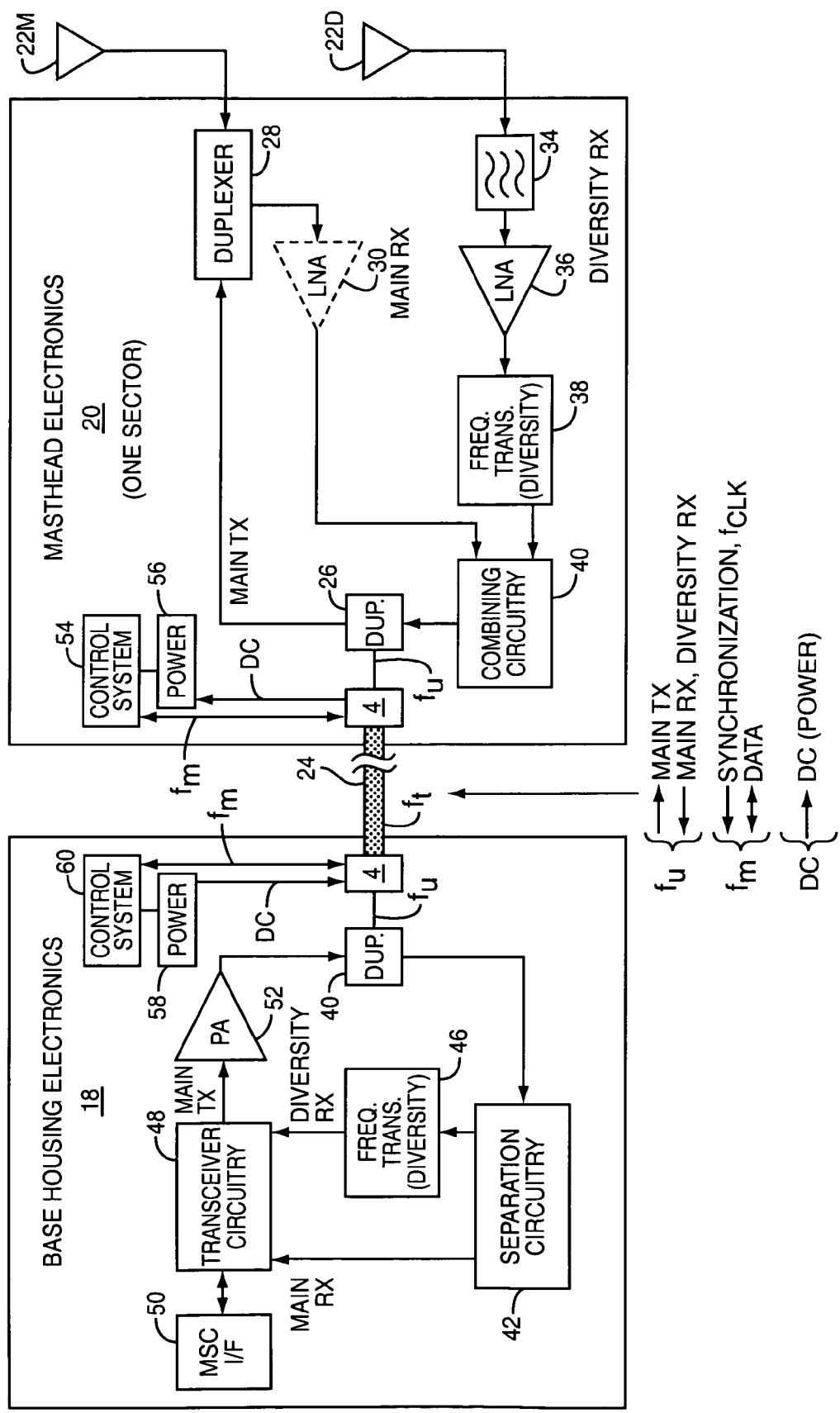
FIG. 7 is a block representation of base housing electronics and masthead electronics according to a second embodiment of the present invention.

Turning now to FIG. 7, a second embodiment of the present invention is illustrated. In this embodiment, the main receive signal is not translated, while the diversity receive signal is translated. Thus, the main receive signal and a translated diversity receive signal are combined in the masthead electronics 20 and sent over the feeder cable 24 to the base housing electronics 18. In particular, the main receive signal is received at main antenna 22M, and forwarded to combining circuitry 40 via the duplexer 28, and through an LNA 30. The diversity receive signal is received at diversity antenna 22D, filtered by the filter 34, amplified by the LNA 36, and translated from the first center frequency $f_{C1}$ to a second center frequency $k_2$ by the diversity frequency translation circuitry 38. The main receive signal and the translated diversity receive signal are combined by combining circuitry 40 and sent to duplexer 26 for delivery to the base housing electronics 18 over the feeder cable 24. Upon receipt, the duplexer 40 at the base housing electronics 18 will send a composite receive signal to the separation circuitry 42, which will provide the main receive signal to the transceiver circuitry 48, and the translated diversity receive signal to the diversity frequency translation circuitry 46, which will translate the translated diversity receive signal back to being centered about center frequency $f_{C1}$ to effectively recover the diversity receive signal, which is then provided to the transceiver circuitry 48 for processing. The main transmit signal is transmitted from the main antenna 22M as described in association with FIG. 5.

Figure 8:
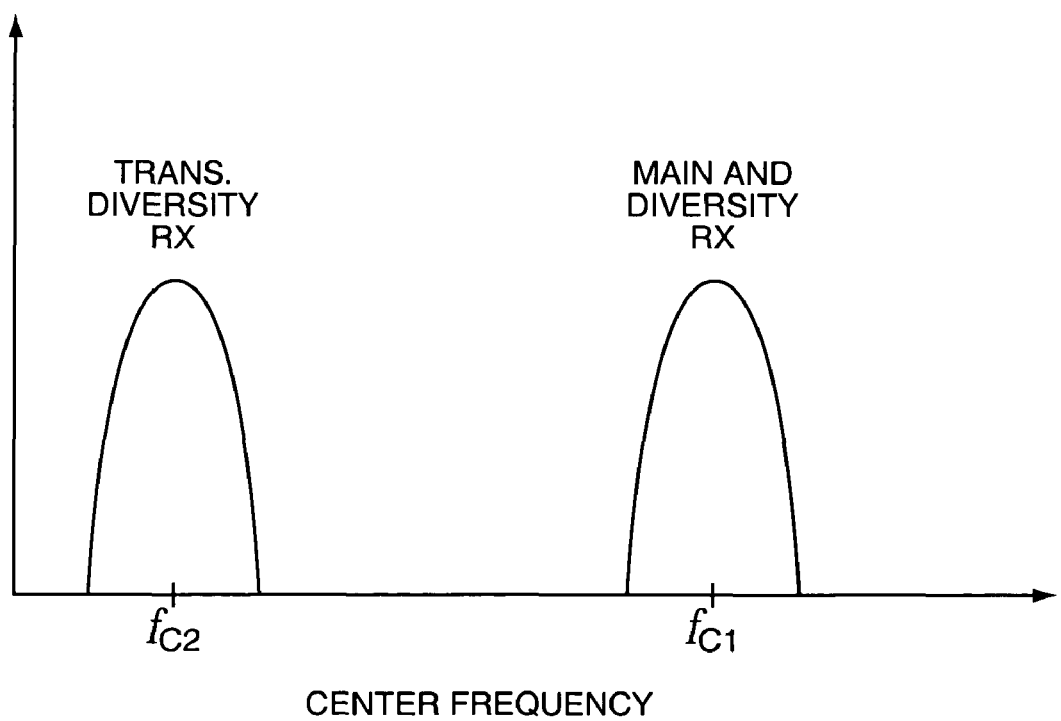
FIG. 8 is a graphical illustration of a frequency translation process according to the embodiment of FIG. 7.

With reference to FIG. 8, a graphical illustration of the translation of the diversity receive signal is shown, as processed in the embodiment of FIG. 7. As illustrated, the translated diversity receive signal is shifted to be centered about center frequency $f_{C2}$, wherein both the main and the original diversity receive signals are centered about center frequency $f_{C1}$.

If a masthead LNA is not desired or needed for the main receive signal, the invention can be further simplified by removing the LNA 30 and Duplexer 28 and combining circuitry 40. In such a case, both the transmit and main receive signals can be fed directly to the duplexer 26, where they will be combined with a translated diversity receive signal. The duplexer 26 would be designed such that the main filter encompass both the main transmit and main receive frequencies, and the other filter would encompass a shifted diversity receive frequency. This implementation would provide a simpler and less costly module while minimizing transmit path loss.

The advantages of this embodiment are twofold. Firstly, the main receive path can be composed of only passive components, thereby improving reliability. Alternatively, if an LNA 30 is desired at the masthead 16 for both the main and diversity receive signals, this embodiment remains simpler since only the diversity receive frequency needs to be translated at the mast, simplifying the electronics and frequency plan.

Figure 9:
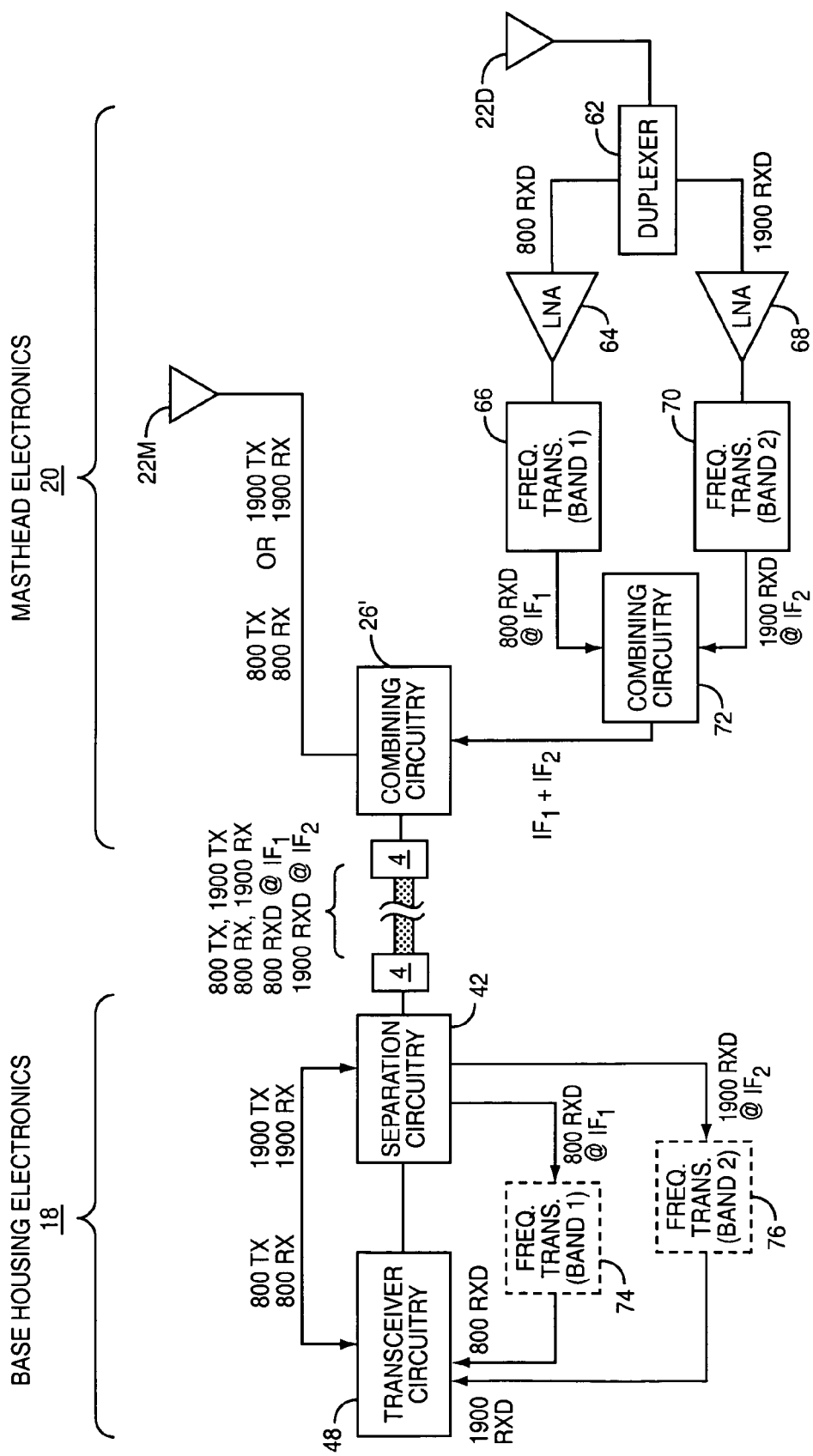
FIG. 9 is a block representation of base housing electronics and masthead electronics according to a third embodiment of the present invention.

Turning now to FIG. 9, a multi-band implementation of the present invention is illustrated. A multi-band communication environment is one in which the same or different cellular communication techniques are supported by a base station environment. As illustrated, a single base housing 12 is used, but different base housings 12 may be used for the different frequency bands. In many instances, the different modes of communication, whether incorporating the same or different underlying communication technologies, are centered about different center frequencies. Two common frequencies about which cellular communications are centered are 800 MHz and 1900 MHz. Accordingly, the base station environment must be able to transmit and receive signals at both 800 MHz and 1900 MHz, and may require diversity antennas 22D to assist in receiving signals. In operation, received signals in the 800 or 1900 MHz bands (BAND 1 and BAND 2, respectively) may be received at diversity antenna 22D, wherein a duplexer 62 will send 800 MHz receive signals (800 RXD) through LNA 64 to BAND 1 frequency translation circuitry 66, which will translate the 800 MHz receive signal about a different center frequency. In this example, assume the BAND 1 frequency translation circuitry downconverts the 800 MHz receive signal to a first intermediate frequency ($IF_1$), wherein the downconverted signal is generally referred to as 800 RXD @ $IF_1$. Similarly, 1900 MHz receive signals (1900 RXD) will be provided through LNA 68 to BAND 2 frequency translation circuitry 70, which will downconvert the 1900 MHz receive signal to a second intermediate frequency ($IF_2$), wherein the downconverted signal is represented as 1900 RXD @ $IF_2$.

The 800 RXD @ $IF_1$ and 1900 RXD @ $IF_2$ signals are combined using combining circuitry 72 to form a composite signal $IF_1+IF_2$, which is provided to combining circuitry 26', which will combine the composite signal $IF_1+IF_2$ with any signals received at the main antenna 22M, and in particular, 800 MHz and 1900 MHz receive signals (800 RX and 1900 RX). Thus, the combining circuitry 26' may combine the 800 and 1900 MHz receive signals with the composite $IF_1+IF_2$ signal and present them over the feeder cable 24 to separation circuitry 42 provided in the base housing electronics 18 via the combining and separation circuitry 4. The separation circuitry 42 will provide the 800 and 1900 MHz signals to the transceiver circuitry 48, as well as send the 800 RXD @ $IF_1$ and 1900 RXD @ $IF_2$ (translated) signals to respective BAND 1 and BAND 2 frequency translation circuitry 74 and 76. The BAND 1 frequency translation circuitry 74 may upconvert the 800 RXD @ $IF_1$ signal to recover the original 800 RXD signal, and the BAND 2 frequency translation circuitry 76 will process the 1900 RXD @ $IF_2$ signal to recover the original 1900 RXD signal. The 800 RXD and 1900 RXD signals are then provided to the transceiver circuitry 48 for processing in traditional fashion. As noted for the previous embodiment, the transceiver circuitry 48 may be modified to process the downconverted or otherwise translated signals without requiring retranslations back to the original center frequencies, as provided by the BAND 1 and BAND 2 frequency translation circuitry 74 and 76.

Accordingly, the above system provides for translating signals from one or more antennas 22 in a base station environment in a manner allowing the translated signals to be combined with one another and other untranslated signals for transmission over a common antenna feeder 24. This system is applicable to single and multi-band communication environments, and is not limited to communication technologies or particular operating frequencies. In general, the translation of received signals need only operate such that when the signals are combined with other signals, there is no interference or the interference is otherwise minimal or manageable. Further, the receive signals may be from any spatially diverse array of antennas for one or more sectors. As noted, two base housings 12 that operate in different bands may share the same feeder cables 24 and masthead 16.

Redundancy is a key issue for masthead electronics 20. Active components which are used in the LNA 30 and frequency translation circuitry 32, 38 are less reliable than passive components used to implement the duplexers 26, combining circuitry 40, and filters 34. As such, it may be necessary to bypass the LNAs 30 within the module. An LNA bypass is standard practice for masthead LNAs 30.

More important is redundancy in the frequency translation circuitry 32, 38. Since the objective is to transmit two receive signals, main and diversity, down the same antenna feeder 24 to the base housing electronics 18, loss of the frequency translation function means that only one of the receive signals can be relayed to the base housing electronics 18. It is therefore important to consider redundancy schemes in practice.

One approach is to simply include multiple levels of redundancy within each circuit block. A more sophisticated scheme would be to further use frequency translation circuitry on both the main receive and diversity receive signals as shown in FIG. 5. However, the frequency translation circuitry 32, 38 should be designed as to allow a signal to pass through with relatively little attenuation in the event of a hardware failure. Such would be the case with a serrodyne implemented using exclusively shunt or reflection type switches. The combining circuitry 40 could be designed to accept a signal at the translated receive frequency or original receive frequency on either port. The frequency translation circuitry 32, 38 would only be used in one branch at any given time, and in the other branch the signal would be passed through the frequency translation circuitry with little or no effect. In the event that the active frequency translation circuitry 32, 38 should fail, the unused frequency translation circuitry 32, 38 could be turned on to implement the frequency translation on this branch, and the failed frequency translation circuitry 32, 38 would then allow the signal to pass through untranslated.

Finally, in cases where four-branch receive diversity is used, it is conceivable that each sector contain one transmit signal and four receive signals. In such a case the present invention could easily be expanded to translate the frequency of all receive signals or alternately on the three diversity receive signals to separate frequencies and combine them all onto one feeder cable 24 where they would be separated by another circuit at the base station housing 12.

Those skilled in the art will recognize improvements and modifications to the preferred embodiments of the present invention, and will appreciate the applicability of the present invention to any system with components connected with multiple cables. All such improvements and modifications are considered within the scope of the concepts disclosed herein and the claims that follow.

What is claimed is:

1. A system comprising a first port, a second port, a third port, a fourth port, and a circuit network interconnecting the first, second, third, and fourth ports, and adapted to:
 a) provide bidirectional passage of signals within a first frequency band between the first and fourth ports, wherein a first signal at a first frequency, the first frequency being within the first frequency band, travels in a first direction between the first and fourth ports across a cable and a second signal at a second frequency, the second frequency being within the first frequency band, travels in an opposite direction from the first direction between the first and fourth ports across the cable;
 b) provide bidirectional passage of signals within a second frequency band between the second and fourth ports, wherein a third signal at a third frequency, the third frequency being within the second frequency band, travels in a first direction between the second and fourth ports across the cable and a fourth signal at a fourth frequency, the fourth frequency being within the second frequency band, travels in both a first direction and an opposite direction from the first direction between the second and fourth ports across the cable; and
 c) provide bidirectional passage of an additional signal between the third and fourth ports, wherein the additional signal travels in a first direction, an opposite direction from the first direction, or in both the first direction and the opposite direction, between the third and fourth ports across the cable.

2. The system of claim 1 wherein the additional signal is a DC signal.

3. The system of claim 1 wherein the additional signal is a baseband signal.

4. The system of claim 1 wherein the additional signal comprises DC and baseband signals.

5. The system of claim 1 wherein the circuit network comprises first and second filter networks, which provide a first impedance between the first and fourth ports, a second impedance between the second and fourth ports, and a third impedance between the third and fourth ports.

6. The system of claim 5 further comprising protection circuitry for coupling to ground.

7. The system of claim 6 wherein the protection circuitry comprises a network of at least one capacitor in parallel with at least one diode or gas discharge tube.

8. The system of claim 1 wherein the first port, second port, third port, and fourth port form a portion of a first apparatus, and further comprising a cable and a second apparatus, which comprises a fifth port, a sixth port, a seventh port, an eighth port, and a second circuit network interconnecting the fifth, sixth, seventh, and eighth ports and adapted to:
  a) provide bidirectional passage of signals within a first frequency band between the fifth and eighth ports;
  b) provide bidirectional passage of signals with a second frequency band between the sixth and eighth ports; and
  c) provide bidirectional passage of DC or baseband signals between the seventh and eighth ports,
  wherein the cable is coupled between the fourth and eighth ports.

9. The system of claim 8 wherein the second circuit network comprises third and fourth filter networks, which provide a first impedance between the fifth and eighth ports, a second impedance between the sixth and eighth ports, and a third impedance between the seventh and eighth ports.

10. The system of claim 8 wherein the first apparatus is located in a base housing and the second apparatus is located in a masthead in a base station environment.

11. The system of claim 10 wherein the first frequency band is configured for transmit and receive signals.

12. The system of claim 11 wherein the second frequency band is configured for a synchronization signal.

13. The system of claim 12 wherein the second frequency band is configured for data.

14. The system of claim 11 wherein the second frequency band is configured for data.

15. The system of claim 11 wherein a signal is provided from the base housing to the masthead to power masthead electronics.

16. The system of claim 10 wherein the base housing electronics in the base housing are coupled to the cable via the first apparatus.

17. A system comprising a first port, a second port, a third port, a fourth port, and a circuit network interconnecting the first, second, third, and fourth ports, and adapted to:
  a) provide bidirectional passage of signals within a first frequency band between the first and fourth ports;
  b) provide bidirectional passage of signals within a second frequency band between the second and fourth ports; and
  c) provide bidirectional passage of an additional signal between the third and fourth ports,
  wherein the circuit network comprises first and second filter networks, which provide a first impedance between the first and fourth ports, a second impedance between the second and fourth ports, and a third impedance between the third and fourth ports; and
  wherein the first filter network comprises a first bias tee network and the second filter network comprises a second bias tee network, the first bias tee network comprising the first and fourth ports and a first node, and the second bias tee network comprising the second and third ports and a second node, which is coupled to the first node.

18. The system of claim 17 wherein the first bias tee network comprises a first LC network coupling the first port, the fourth port, and the first node, and the second bias tee network comprises a second LC network coupling the second port, the third port, and the second node.

19. The system of claim 18 wherein the first LC network comprises a first capacitance coupled between the first and second ports and a first inductance coupled between the first node and the fourth port, and wherein the second LC network comprises a second capacitance coupled between the second port and the second node and a first inductance coupled between the second node and the third port.

20. A system comprising a cable, a first port, a second port, a third port, a fourth port, a fifth port, a sixth port, a seventh port, and a eighth port, wherein the first port, second port, third port, and fourth port form a portion of a first apparatus located in a base housing, and the fifth port, sixth port, seventh port, and the eighth port form a portion of a second apparatus located in a masthead in a base station environment, and further comprising a first circuit network interconnecting the first, second, third, and fourth ports, and a second circuit network interconnecting the fifth, sixth, seventh, and eighth ports, wherein the first circuit network is adapted to:
  a) provide bidirectional passage of signals within a first frequency band between the first and fourth ports;
  b) provide bidirectional passage of signals within a second frequency band between the second and fourth ports; and
  c) provide bidirectional passage of an additional signal between the third and fourth ports,
  wherein the second circuit network is adapted to:
  d) provide bidirectional passage of signals within a first frequency band between the fifth and eighth ports;
  e) provide bidirectional passage of signals with a second frequency band between the sixth and eighth ports; and
  f) provide bidirectional passage of DC or baseband signals between the seventh and eighth ports.
  wherein the cable is coupled between the fourth and eighth ports, and
  wherein masthead electronics in the masthead comprise:
  g) a first input adapted to receive a first receive signal centered about a first center frequency from a first antenna;
  h) a second input adapted to receive a second receive signal centered about the first center frequency from a second antenna;
  i) first translation circuitry adapted to translate the first receive signal from the first antenna to being centered about a second center frequency; and
  j) combining circuitry adapted to combine the first receive signal centered about the second center frequency and the second receive signal to form a composite signal, which is sent to base housing electronics over the cable via the second apparatus in the first frequency band.

21. The system of claim 20 wherein the first receive signal centered about the second center frequency is combined with the second receive signal centered about the first center frequency to form the composite signal.

22. The system of claim 21 wherein the first center frequency and the second center frequency are sufficiently spread to minimize interference between the first and second receive signals in the composite signal.

23. The system of claim 20 wherein the masthead electronics further comprise second translation circuitry adapted to translate the second receive signal from the second antenna to being centered about a third center frequency, wherein the first receive signal centered about the second center frequency is combined with the second receive signal centered about the third center frequency to form the composite signal.

24. The system of claim 23 wherein the second center frequency and the third center frequency are sufficiently spread to minimize interference between the first and second receive signals in the composite signal.

25. The system of claim 20 wherein the second antenna is a main antenna also used to transmit signals centered about the first center frequency, and the first antenna is a diversity antenna associated with the second antenna, the masthead electronics further comprising circuitry adapted to transmit a transmit signal via the main antenna.

26. The system of claim 20 wherein a plurality of receive signals, including the second receive signal, are received and translated to being centered about different center frequencies and combined to form the composite signal.

27. The system of claim 20 further comprising in the base housing:
 a) transceiver circuitry; and
 b) separation circuitry adapted to separate the first and second receive signals from the composite signal in the base station electronics, wherein the first and second receive signals are provided to transceiver circuitry.

28. The system of claim 27 further comprising, in the base housing, second translation circuitry adapted to translate the first receive signal to being centered about the first center frequency prior to providing the first receive signal to the transceiver circuitry.

29. The system of claim 28 wherein the second receive signal is translated to a third center frequency before being combined with the first receive signal to form the composite signal, and further comprising third translation circuitry adapted to translate the second receive signal to being centered about the first center frequency prior to providing the second receive signal to the transceiver circuitry.

30. The system of claim 20 wherein the first and second receive signals correspond to a cellular signal transmitted from a cellular communication device.

31. The system of claim 20 wherein the first and second antennas are associated with one of a plurality of sectors for the base station environment.

32. The system of claim 31 wherein each sector uses one cable between the masthead and the base housing.

33. The system of claim 20 wherein the first center frequency is associated with a first cellular band and a fourth center frequency is associated a second cellular band; a third receive signal centered about a third center frequency is received via the first input from the first antenna; a fourth receive signal centered about the third center frequency is received via the second input from the second antenna, the masthead electronics further comprising second translation circuitry adapted to translate the third receive signal from the first antenna to being centered about a fourth center frequency, the combining circuitry further adapted to combine the third receive signal centered about the third center frequency and the second receive signal to form at least part of the composite signal, which is sent to the base housing over the cable.

34. The system of claim 33 further comprising third translation circuitry adapted to translate the fourth receive signal from the second antenna to being centered about the fourth center frequency, wherein the third receive signal centered about the fourth center frequency is combined with the fourth receive signal centered about the fourth center frequency to form at least part of the composite signal.

* * * * *